Jan. 4, 1927.

D. I. REITER 1,612,943

SNAP FASTENER

Filed Feb. 16, 1925

INVENTOR
Daniel I. Reiter,
By Attorneys,
Fraser, Myers & Manley

Patented Jan. 4, 1927.

1,612,943

UNITED STATES PATENT OFFICE.

DANIEL I. REITER, OF NEW YORK, N. Y., ASSIGNOR TO RAU FASTENER COMPANY, OF PROVIDENCE, RHODE ISLAND, A CORPORATION OF RHODE ISLAND.

SNAP FASTENER.

Application filed February 16, 1925. Serial No. 9,475.

This invention relates to improvements in snap fasteners of the stud and socket type. Although adapted for general application, it provides a fastening means which is especially well suited for use in the attachment of belt buckles and the like.

It is an object of the invention to provide a relatively strong and unyielding snap fastener the parts of which shall at all times be maintained in a tightly clasped relation, thereby eliminating looseness or free movement either in a lengthwise direction or in a direction transverse with respect to the axis of the socket.

In the drawings illustrating the preferred and modified forms of the invention,—

Figure 2:
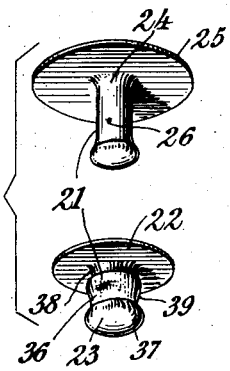
Fig. 2 is a like view of corresponding parts of the stud element of the fastener.
Figure 1:
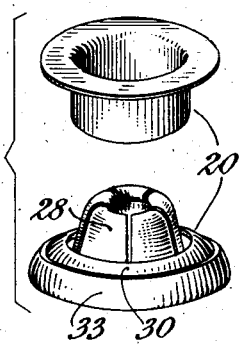
Figure 1 is a perspective view of parts of the socket element of the fastener ready to be secured to the article in connection with which it is to be used.

Referring first to Figs. 1 to 5, inclusive, illustrating the preferred form of the invention, the snap fastener comprises, in general, a socket 20 and a stud 21.

The stud comprises a base portion or disk 22 and a socket engaging portion or coupling element 23. The coupling element 23 may be secured to the leather fabric or other material of the article to be united by the fastener, by means of the clamping member 24 comprising a base or clamping disk 25 and a stud-like element 26. The clamping element 24 is inserted within the coupling element and expanded into the enlarged head thereof, whereby the stud is firmly secured to the material 27 of the garment or other article on which it is used, a portion of which is clamped between the disks 22 and 25, as clearly indicated in Fig. 3.

Figure 3:
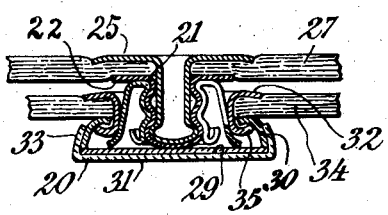
Fig. 3 is a view in cross section of the two parts of the snap fastener, said parts being shown in their engaged relation.

The snap fastener socket may comprise a stud grasping element 28, which may be secured to the material of the garment or other article on which it is used, by means of a backing plate or disk 29, Fig. 3, a retaining ring 30, a uniting element 31, and a clamping ring 32. As indicated in Fig. 3, all parts of the socket other than the clamping ring are first secured together by placing the retaining ring 30 over the stud grasping element 28, then applying the backing disk 29, and securing said parts together by means of the uniting member 31, flanges 33 of which are turned inwardly over the base portion of the retaining ring 30. The socket is then secured to the material 34 of the garment or other article on which it is used, by inserting the clamping ring 32, sufficient force being used to cause the inserted cylindrical portion of said ring to be turned outwardly and clinched within the inner portion of the retaining ring 30, as indicated at 35, Fig. 3. The fabric or other material is thus firmly clamped between the surface of the retaining ring 30 and the disk-like portion of the clamping ring 32.

Snap fasteners provided, in general, with parts corresponding with those heretofore described and adapted to be fastened to the material on which they are used in a like manner, are well known in the art. This type of well-known fastener has been selected as an appropriate means of illustrating the manner in which the specific features of the fastener herein disclosed, and in which the invention herein claimed is embodied, may be applied in practice. The novel features of the invention herein illustrated will now be described.

In the preferred form of the invention, the stud 21 comprises a coupling element having protuberances 36, 37 arranged in tandem relation and adapted to be grasped by the stud engaging portions of the socket. The protuberance or head 36 is connected with the base or disk 22 by means of a neck portion 38 of reduced diameter, and the enlargement or protuberance 37 is likewise connected with the head or protuberance 36 by means of a similar neck 39 the diameter of which is relatively small compared with that of the protuberances.

Figure 4:
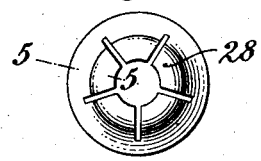
Fig. 4 is a top view of the stud grasping portion of the fastener socket.
Figure 5:
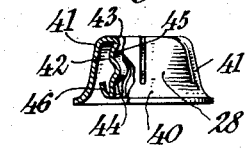
Fig. 5 is a view of the stud grasping element, shown partly in side view and partly in cross section along the line 5—5 of Fig. 4.

The stud grasping element of the socket, a detached illustration of which will be found in Figs. 4 and 5, comprises a relatively rigid supporting portion preferably in the form of an annulus 40, from which extend an annular series of flexible fingers 41, said fingers having stud grasping portions 42 crimped and turned inward so as to return upon themselves and extend into the interior of the annulus. The crimps may be so disposed as to provide for the socket member a restricted expansible entrance orifice, as at 43, a restricted expansible throat, as at 44, and an intervening enlarged stud receiving recess, as at 45.

In the preferred form of the invention, the ends of the stud grasping portions of the fingers 41 may be turned outwardly and double upon themselves so as to extend within the space between said stud grasping portions and the inner surface of the annulus, as at 46, Fig. 5. The ends 46 may be so disposed as to be brought in contact with the surface of the annulus, which may serve as a limiting stop during the movements of the stud grasping elements when the stud is being inserted and withdrawn. By thus having the stud grasping portions of the socket supported at both ends a relatively strong structure is provided, which tenaciously resists forces tending to separate the parts of the snap fastener and thereby avoids accidental or unintended separation. The stud grasping parts of the socket are, however, sufficiently flexible to permit the withdrawal of the stud by a firm endwise pull when it is desired to separate the parts of the fastener.

When the stud member of the above-described snap fastener is inserted in the socket member, the enlargement or protuberance 37 is first forced through the crimps of the stud grasping portions of the socket at the restricted orifice 43. On further movement the enlargement 37 of the stud is forced beyond the crimps which form the restricted throat 44 of the socket member, and at the same time the protuberance or head 36 is forced beyond the crimps which form the restricted entrance orifice. The flexible stud grasping portions 42 of the fingers 41 then close tightly upon the stud, the head 36 being closely embraced by the portions of the fingers which define the enlarged stud receiving recess between the throat and the entrance orifice, and the enlargement 37 being firmly held by the crimps which form the restricted throat of the socket member and portions of the fingers lying between said crimps and their free ends. The neck portions 38 and 39 of the stud member are of substantially the same diameter as the entrance orifice 43 and throat 44 of the socket member respectively, and the head 36 is of such form and dimensions as to be held between the crimps at the entrance orifice and throat of the socket member in a wedge-like manner, so as to avoid any looseness or lost motion between the parts of the snap fastener when they are engaged.

Figure 6:
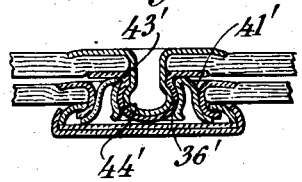
Fig. 6 is a cross-sectional view of a snap fastener involving a modified form of stud and a modified form of socket member.

In Fig. 6 is illustrated, in cross section, a modified form of snap fastener embodying features of the invention, the parts thereof which correspond with parts of the preferred form as illustrated in Figs. 1 to 5 being designated by the same reference characters to which primes are added. In this form illustrated in Fig. 6 it will be observed that the enlargement or protuberance 37 of the stud element has been omitted, the head or protuberance 36' being snugly embraced by the stud grasping portions of the fingers 41' between the crimps which form the entrance orifice 43' and the throat 44'. In this form the outwardly turned ends of the stud grasping portions of the fingers, as illustrated at 46, Fig. 5, have been omitted.

It will be obvious that the structure of Fig. 6 may be stiffened, if desired, by the use of the outwardly turned end portions. It will also be apparent that the outwardly turned end portions may be omitted from the form of the invention illustrated in Fig. 3, involving the stud having successive protuberances 36 and 37.

The various parts of the invention may be constructed of brass or other appropriate material and assembled by the usual stamping, drawing, spinning and other metal working operations well known in the art.

It will be apparent that the inturned stud grasping elements, which are held in close engaging contact with the coupling element of the stud, tend to maintain the parts of the fastening device in concentric alignment and avoid undesirable looseness and relative tilting of the parts which frequently results in their accidental separation. The successive cooperating stud engaging elements comprising the tandem protuberances of the coupling element and the crimps at the entrance orifice and throat of the socket, as embodied in the preferred form of the invention, also contribute to the production of a stiff and tenacious snap fastener well adapted for heavy service.

The invention is not intended to be limited to the specific forms herein illustrated and described for purposes of illustration, but is capable of being varied or modified within the scope of the appended claims.

What I claim is:

1. A snap fastener comprising, in combination, a socket member and a cooperating stud member, said socket member consisting of a relatively rigid supporting annulus and an annular series of flexible fingers extending therefrom, said fingers having stud grasping portions crimped and turned inward so as to return upon themselves and extend into the interior of said annulus, the crimps in said fingers being so disposed as to provide for said socket member a restricted entrance orifice, a restricted throat and an intervening enlarged stud receiving recess, and said cooperating stud member having a neck substantially equal in diameter to that of said entrance orifice and a head of such relative form and dimensions as to be capable of being forced through said entrance orifice and firmly held by said fingers in said stud receiving recess with its surface snugly embraced between the series of crimps forming said entrance orifice and throat.

2. A snap fastener comprising, in combination, a socket member and a cooperating stud member, said socket member consisting of a relatively rigid supporting annulus and an annular series of flexible fingers extending therefrom, said fingers having stud grasping portions crimped and turned inward so as to return upon themselves and extend into the interior of said annulus, the crimps in said fingers being so disposed as to provide for said socket member a restricted entrance orifice, a restricted throat and an intervening enlarged stud receiving recess, and said cooperating stud member having a neck substantially equal in diameter to that of said entrance orifice, a head of such relative form and dimensions as to be capable of being forced through said entrance orifice and firmly held by said fingers in said stud receiving recess, and an enlargement extending beyond said head and connected therewith by a neck of a diameter substantially equal to that of said throat, said enlargement being capable of being forced through said throat and held by the series of throat forming crimps of the flexible fingers.

3. A snap fastener socket member comprising a relatively rigid supporting annulus and an annular series of flexible fingers extending therefrom, said fingers having stud grasping portions crimped and turned inward so as to return upon themselves and extend into the interior of the annulus, the crimps in said fingers being so disposed as to provide for said socket member a restricted entrance orifice, a restricted throat, and an intervening enlarged stud receiving recess.

4. A snap fastener socket member comprising a relatively rigid supporting annulus and an annular series of flexible fingers extending therefrom, said fingers having stud grasping portions crimped and turned inward so as to return upon themselves and extend into the interior of the annulus, the crimped portions of said fingers forming a stud receiving recess of relatively large diameter between orifices of relatively small diameter, and the ends of said fingers being turned outwardly and doubled upon the stud grasping portions so as to extend into the space between said portions and the inner surface of said annulus.

5. A snap fastener socket member having a series of annularly disposed inturned flexible fingers, said fingers being provided with spaced inwardly directed stud-grasping protuberances which cooperate to provide for said socket member an expansible restricted entrance orifice, an expansible restricted throat, and an intervening stud receiving recess.

In witness whereof, I have hereunto signed my name.

DANIEL I. REITER.